United States Patent Office 3,562,237
Patented Feb. 9, 1971

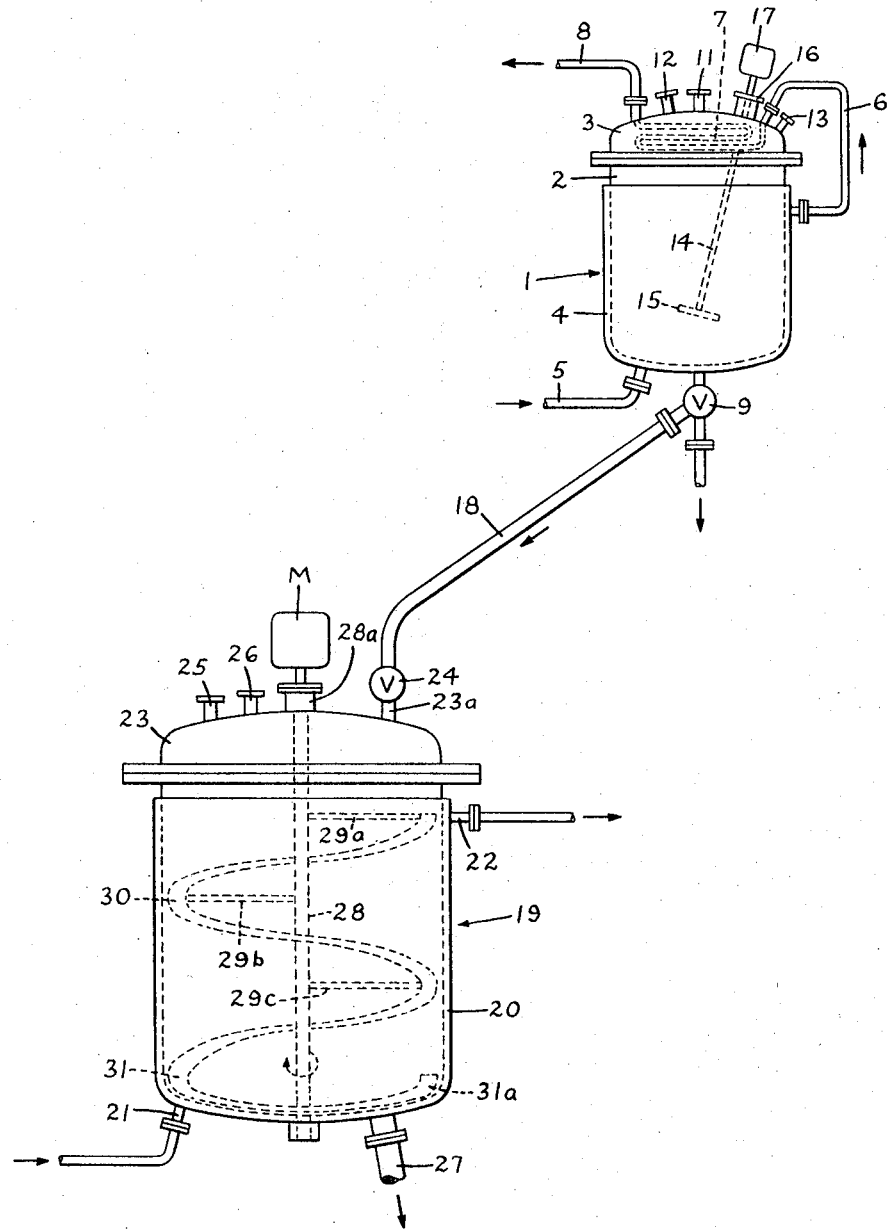

---

3,562,237
PREPARATION OF VINYL CHLORIDE POLYMERS
Jean Claude Thomas, Lyon, Rhone, France, assignor to Produits Chimiques Pechiney - Saint - Gobain, Paris, France
Continuation-in-part of application Ser. No. 347,147, Feb. 25, 1964. This application Nov. 30, 1964, Ser. No. 414,697
Claims priority, application France, Apr. 30, 1964, 972,927
Int. Cl. C08f 1/04, 3/30
U.S. Cl. 260—92.8                                    1 Claim

ABSTRACT OF THE DISCLOSURE

Method and apparatus for the polymerization in mass of vinyl chloride and mixtures thereof with vinyl acetate, wherein the monomer is prepolymerized in a first autoclave, under controlled temperature and pressure and at a relatively rapid rate for a relatively short time, until polymerization hass been completed to about 7 to 15%. The flowable mixture of monomer and polymer is then rapidly transferred to a second autoclave wherein polymerization to the desired degree, say 70%, is completed at a slower rate and for a more extended time. The second autoclave is of a type having a tank with vertical axis of symmetry and a helical mixing blade rotating on the axis of symmetry and closely adjacent the walls of the tank, but radially spaced from its axis of rotation. Thereby a tubular column of mixture is continuously moved vertically in contact with the temperature-controlled walls of the ttank, and returns in a central generally cylindrical column along the axis of rotation. Precise and uniform temperature control are thus effected, and granulometry is improved.

---

This application is an improvement of the invention described and claimed in application Ser. No. 347,147, now abandoned, and a continuation-in-part thereof.

In the earlier case there has been described a method of preparing polymers and copolymers of vinyl chloride in mass, that is to say in the absence of solvents and diluents, by polymerizing in a plurality of steps; in a first step the monomer has been polymerized with high speed agitation until about 7 to 15% polymerization has been attained, the polymerization being continued and concluded thereafter with relatively mild agitation, which was yet able to produce good thermal control of the reaction mass. The use of a prepolymerizer autoclave equipped with a high speed agitator, e.g. of turbine type, followed by the use of one or more horizontal autoclaves equipped with relatively slow speed agitators of ribbon blender type, was also described. A further disclosure was made of a prepolymerizer coupled to one or more rotary horizontal autoclaves, the former including high speed agitation and the latter acting by rolling means to generate agitation of the mass. Another disclosure presented a prepolymerizer equipped with a high speed agitator connected to a stationary autoclave utilizing long, blade type stirrers of slow speed extending the length of the autoclave and working near the wall. Finally, there was disclosed a prepolymerizer, equipped with high speed type agitation, connected to a stationary horizontal autoclave equipped with short agitation blades working slowly near the wall and others nearer the axis.

The present invention is intended to perfect and improve the process and apparatus which are set forth in the former case. It is an object of the invention to further modify the type and speed of agitation in the second autoclave while improving the heat exchange and the perfection of the polymer, thus to produce superior products.

According to this invention the first, incomplete stage of polymerization, the prepolymerization, of the vinyl chloride or comonomers is carried out in mass in a prepolymerizer of the high speed type described in the former case, and the subsequent stages are carried out in a cylindrical autoclave of vertical axis provided with vertically operating, helical blades which rotate slowly near the walls. In its preferred form a vertical, axial shaft penetrates the autoclave and rotates helical blades near a wall equipped with a water jacket, moving the peripheral part of the mass along the water jacket at a rate which best control the reaction until the top or bottom of the mass is reached and the peripheral components flow centripetally and axially until they once more engage the water jacket.

In a preferred operation the agitator has helical blades constructed to rotate near the wall to impart an ascending movement to the periphery of the mass, setting up a current which flows inwardly and downwardly about the shaft of the impeller and to the outer wall of the autoclave again, providing a systematic double current and a controlled engagement of every part of the mass with the heat exchanger which is repeated at regular intervals. This also assures good mixing of all parts of the mass and a very homogeneous product.

According to a modification, the helical blades of the agitator may be segmental rather than continuous, each length being a short length of a helix mounted on the shaft to turn near the wall. It is also possible to use a plurality of helical agitators near the wall, and helical agitators or helical segments of short radius operating near the shaft to control and maintain the rate of downflow.

The speeds of the helical agitators required by the main autoclave of this invention are lower than the speeds required by prior art types and processes of polymerization, for instance one tenth to one twentieth of them. This provides a saving in power and more uniform products. For example, a verical autoclave of 2 cubic meters capacity required 75 r.p.m. by prior art processes, but this invention reduces it to 3 to 10 r.p.m.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claim.

The figure of the drawing is a vertical elevational view, partly in phantom, of a preferred type of apparatus.

Referring to the numerals of the drawing, a cylindrical prepolymerizer autoclave 1 with a spherical bottom has a pot 2 in which the reaction occurs, a water jacket 4 which cover the side and bottom of the pot, and a discharge valve 9 which passes through the water jacket into the pot. The cover 3 of the autoclave is provided with inlet ports 11, 12 which are provided with valves, not shown, for the controlled admission of monomer and an atmosphere of nitrogen, respectively. A port 13, similarly valved, is connected to a source of vacuum. A tight fitting 16 supports the motor 17 of a high speed impeller 15 the shaft 14 of which passes through the fitting. A flexible hose 6 connects a cooling coil 7 within the cover to the water jacket 4 and conduits 5, 8 for liquid supply the jacket and coil with water at whatever temperature is required for optimum operation of whatever process is going on in the apparatus. The apparatus is particularly useful in the preparation of polyvinyl chloride and the further description will be directed to that subject.

A conduit 18 connects the prepolymerizer through valve 24 to the main autoclave 19 which has a discharge port 27 in a spherical bottom, a water jacket 20 which covers the bottom and practically the full height of the wall, and ports 21, 22 which provide for the flow of temperature controlling fluid through the jacket. The port 27 is of large size, so as to provide free discharge of the product, and is sealed in any standard manner. The cover 23 of the autoclave is provided with inlet port 23a for the partly polymerized product of autoclave 1, a gas release of valved type 25, a safe seal 26, and a tight mounting 28a for the shaft 28 of helical impeller 30, 31 and segmental helical impeller 31a, the latter of which operates close to the spherical bottom of the autoclave while the helical impeller blade 30, supported by rods 29a, b, and c closely approaches the cylindrical wall. A motor M of low speed type, equipped preferably with reduction gearing, not shown, imparts low speed to the helical blades.

In the prepolymerizer a high speed stirrer is employed, for instance one of turbine type and of simple geometric form or an agitator of "bicone" type. The speeds used will be chosen as a function of the resin being prepared, its granulometry, and the type of agitator used. In making polyvinyl chloride and its copolymers in mass speeds of 500 to 1,500 r.p.m. have been found most useful without constituting equatorial limits. The prepolymerizer is provided with the usual instruments of control such as pressure gage, thermometer, and safety instruments, which are not shown. The helical stirrer can be provided with scrapers if desired, to operate against the wall, or its edge may be spaced from the wall. It may be made of blue steel or of plastic on a metal core.

In operating the apparatus all valves are opened for the flow of nitrogen gas, which sweeps the air out of both autoclaves and the connecting pipe 18, or preferably a small quantity of vinyl chloride can be used for the same purpose. The valve 9 is then closed, the prepolymerizer is charged with the quantity of monomer to be prepolymerized, for instance vinyl chloride under sufficient pressure to be liquid, the temperature of the jacket is established by the flow of water at selected temperature and the impeller is started at high speed. The polymerization is carried on with high speed agitation to the desired incomplete end point, for instance 10%, the valve 9 is opened and the contents are discharged into the main autoclave where the polymerization proceeds with low speed agitation to completion, that is to say, to the chosen end point. This may be about 70%, after which gases are released as in ordinary practice, vacuum is aplied to recover monomer from the granular mass of polymer, a nitrogen atmosphere sweeps out, scavenges the apparatus and the product is discharged through port 27.

This invention has demonstrated that it is advisable for best results to move the periphery of the polymerization mass vertically in contact with the jacketed wall of the autoclave, and by changing the speed of rotation of the helix and by the use of helices of different pitch it is possible to attain a perfection of control of the process that was impossible to the prior art. Low pitch of the helix and slow rotation are both advantageous. For example, a vertical, cylindrical autoclave having a volume of 2 m.$^3$, an exterior diameter of 122 cm., a helical pitch of 103 cm., and a total height of the helix equal to 1½ times the pitch plus 25 cm., and a total height of 179.5 cm., lifted the peripheral polymerization mass up the wall about 1 meter per turn of the helix. In fact, the apparatus is so flexible and controllable that the rate of heat exchange with the jacket is not at all critical. Under any rational system of operation the degradation of the polymer by local overheating is prevented, perfection of intermixing takes place, and uniformity of product results.

The following examples illustrate the invention without detracting from the generality of what is elsewhere herein stated.

EXAMPLE 1

This example is for comparison; it follows a standard technique of the prior art.

A stationary vertical autoclave 2 m.$^3$ capacity having a helical blade type agitator of stainless steel shaped as in the drawing received 800 kg. of vinyl chloride after scavenging by 80 kg. of vinyl chloride. As catalyst, the mass received 128 g. (.016%) of azodiisobutyronitrile (ADBN) catalyst. Agitation was at a typical speed of 75 r.p.m. The temperature rose rapidly to 62° C. and a relative pressure of 9.5 kg./cm.$^2$. Polymerization to the chosen endpoint was completed after 14 hours, 30 minutes, the autoclave was blown and a 65% yield was obtained of a polymer powder having the Fikentscher K of 62. Its apparent density was .350 and its granulometric distribution (granulometry) was as follows, the lower line of the table being the percent fallthrough.

TABLE I

| Screen apertures in m$\mu$: | Percent fallthrough |
|---|---|
| 630 | 96 |
| 500 | 94 |
| 400 | 93 |
| 315 | 90 |
| 250 | 79 |
| 200 | 39 |
| 160 | 17 |
| 100 | 6 |

The strain sizes were widely distributed.

EXAMPLE 2

A vertical autoclave of 1,000 l. in stainless steel provided with a turbine agitator 300 mm. in diameter arranged as in the drawing and rotated during the prepolymerization at 720 r.p.m. received 800 kg. of vinyl chloride and 144 g. of ADBN (.018% of the weight of the monomer). 80 kg. of vinyl chloride monomer was used to scavenge the autoclave. The temperature of the reaction rose rapidly to 62° C. and a pressure of 9.5 kg./cm.$^2$.

After 2 hours of polymerization the mixture of monomer and polymer was flowed to a vertical autoclave of the type described in Example 1 which had been scavenged in like manner. The transfer took 1 minute. The helical agitator was rotated at 10 r.p.m. and the conditions were maintained at 62° C. and 9.5 kg./cm.$^2$. Polymerization continued 13 hours, making a total of 15 hours.

On discharge there was a yield of 70.8% compared to the 65% of Example 1, of a powder having K=62, apparent density .52 compared to the .35 of Example 1, and the following granulometry:

TABLE II

| Screen sizes: | Percent fallthrough |
| --- | --- |
| 630 | 99 |
| 500 | 98 |
| 400 | 98 |
| 315 | 98 |
| 250 | 97 |
| 200 | 93 |
| 160 | 90 |
| 100 | 1 |

The granulometry was concentrated in fewer sizes, the majority of particles being of sizes above 100 mµ and below 160 mµ.

A similar test was carried out using a speed of 5 r.p.m. for the helix, producing a polymer of equal quality.

EXAMPLE 3

This example shows the results of a prior art process of copolymerization:

The autoclave of Example 1 was scavenged and received 752 kg. of vinyl chloride, 48 kg. of vinyl acetate, and 168 g. (.021% by weight) of ADBN. The speed of the helix was 75 r.p.m., the temperature of the reaction 60° C. and the pressure 9 kg./cm.$^2$. Polymerization proceeded for 12 hours, 15 minutes. The yield was 69.8% of a copolymer of apparent density .5 having the following distribution of sizes:

TABLE III

| Screen (mµ): | Percent fallthrough |
| --- | --- |
| 630 | 96 |
| 500 | 90 |
| 400 | 88 |
| 315 | 80 |
| 250 | 70 |
| 200 | 35 |
| 160 | 18 |
| 100 | 12 |

The granulometry, size distribution, was widely distributed.

EXAMPLE 4

A similar copolymerization was carried out according to this invention:

The prepolymerizer of Example 2 was scavenged and received 752 kg. of vinyl chloride, 48 kg. of vinyl acetate, and 184 g. (.023% by weight) of ADBN. The agitator ran at 730 r.p.m., the temperature was 60° C. and the pressure 9 kg./cm.$^2$. After 2 hours, 30 minutes of polymerization the mixture was transferred to the main autoclave of Example 2, which had been scavenged; the transfer took one minute. The helical agitator was rotated at 10 r.p.m., the temperature was 60° C., and the pressure 9 kg./cm.$^2$. Polymerization in the main autoclave took 10 hours, 30 minutes, for a total of 13 hours. After discharge the yield was 71.2% compared to the 69.8% of Example 3, and the apparent density was .65 compared to the .5 of that product. The granulometry was as follows:

TABLE IV

| Screen (mµ): | Percent fallthrough |
| --- | --- |
| 630 | 98 |
| 500 | 97 |
| 400 | 95 |
| 315 | 94 |
| 250 | 92 |
| 200 | 88 |
| 160 | 60 |
| 100 | 1 |

The grains were more concentrated in fewer sizes, 60% of all particles being between 100 and 160 mµ, and 88% of them were smaller than 200 mµ.

Another test was carried out under like conditions using a speed of 5 r.p.m. with similarly improved results compared to the prior art.

Some of the advantages of the invention have been set forth above. Others are that the two step process of this case, using prepolymerization with high speed agitation and completion of polymerization at low speed while moving the periphery of the mass upward (or downward) along the wall by a helical blade agitator, produces high density resins, more concentrated grain sizes, and sizes of grains which can be controlled by the conditions in the autoclaves, particularly the speed of agitation in the prepolymerizer. The new process reduces power consumption compared to that required in the prior art, single operation systems.

The new system keeps the main autoclave wall clean, by eliminating the projection of particles against it and the gradual formation of crusts. The new process also maintains more uniform conditions especially by establishing constant and uniform displacement of the material in contact with the wall and more uniform subjection of all parts of the mass to like conditions of treatment.

The new process permits better use of the full capacity of the apparatus during polymerization and better conditions of filling and discharge. A particular advantage of the apparatus is that the filling and security devices are all located in the cover, hence are in a gaseous area of small volume, so that in case of an automatic release of pressure there is almost no escape of polymer. Even with relief of pressure is very rapid there is substantially no escape of polymer.

From the foregoing description it will appear that the invention relates particularly but not exclusively to a process of preparing polymers and copolymers of vinyl chloride, in a plurality of stages of which the first is carried only to 7 to 15% of completion with high speed agitation, leaving a liquid polymerization mass easy to flow elsewhere, and the second is carried out with low speed agitation of toroidal type, the flow being, preferably, upward peripherally adjacent a heat exchanger wall and downward at the center. The prepolymerizer may employ many kinds of high speed agitation, of which turbines and bicones are typical, but the main autoclave should be vertically cylindrical and equipped with a slow speed helical agitator working adjacent the wall. This establishes controlled flow, superior mixing, and a better product. The agitator may have continuous helical blades or blades forming segments of helixes. There may be an inner helix, usually of different pitch, to control the axial flow of the mass. Both types, continuous and segmental may be used by attachment to a single rotary, axial shaft.

As many apparently widely different embodiments of the present invention may be made without departing from the spirit and scope thereof, it is to be understood that the invention is not limited to the specific embodiments.

What is claimed is:

1. The method of preparing in mass, polymers and copolymers of vinyl chloride base, by homopolymerization or copolymerization of monomers, in which the operation of homopolymerization or copolymerization is divided into two sequential stages, namely, a first stage in an apparatus effecting a high rate of agitation wherein a conversion of the monomers is effected, of the order of 7% to 15%, preferably about 8% to 10%, and a second stage in which the polymerization is carried out to completion, subsequent to said first stage, in one or more apparatuses effecting agitation at a slower rate, said slower rate of agitation being, nevertheless, sufficient to assure good thermosynthesis of reaction to the completion of the homopolymerization or copolymerization, said second stage being carried out by a controlled and regulated circulation of the reactive mass in an essentially vertical autoclave provided with an agitator comprising at least one ribbon blade extending helically about its vertical axis of rotation, contiguous to the vertical walls of the autoclave tank, and radially spaced from said axis, the operation of the agitator, during polymerization, effecting an ascending essentially tubular mass of the reactive mass contiguous to the walls of the autoclave tank, and a central, gravitationally descending portion of the reactive mass along the central part of the autoclave tank.

References Cited

UNITED STATES PATENTS

| | | | |
|---|---|---|---|
| 2,961,432 | 11/1960 | Fikentscher et al. | 260—87.1 |
| 2,727,884 | 12/1955 | McDonald et al. | 260—92.8 |
| 3,156,451 | 11/1964 | Waas | 259—134 |
| 3,206,287 | 9/1965 | Crawford | 260—92.8 |
| 2,673,193 | 3/1954 | Kolvoort | 260—92.8 |
| 2,717,248 | 9/1955 | Vaughn et al. | 260—92.8 |
| 2,706,108 | 4/1955 | Miner | 259—8 |
| 2,746,729 | 5/1956 | Eakins | 259—8 |

FOREIGN PATENTS

| | | | |
|---|---|---|---|
| 1,257,780 | 2/1961 | France | 260—92.8 |

OTHER REFERENCES

Seymour, H., Agitating, Stirring and Kneading Machinery, London, Ernest Benn Ltd. (1925), pp. 47 and 51.

JOSEPH L. SCHOFER, Primary Examiner

J. A. DONAHUE, Jr., Assistant Examiner

U.S. Cl. X.R.

260—87.1, 87.5